(12) United States Patent
Bruset

(10) Patent No.: US 12,452,114 B2
(45) Date of Patent: Oct. 21, 2025

(54) LOW-POWER RADIO TRANSMISSIONS

(71) Applicant: Nordic Semiconductor ASA, Trondheim (NO)

(72) Inventor: Ola Bruset, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 147 days.

(21) Appl. No.: 18/568,492

(22) PCT Filed: Jun. 9, 2022

(86) PCT No.: PCT/EP2022/065623
§ 371 (c)(1),
(2) Date: Dec. 8, 2023

(87) PCT Pub. No.: WO2022/258729
PCT Pub. Date: Dec. 15, 2022

(65) Prior Publication Data
US 2024/0291700 A1    Aug. 29, 2024

(30) Foreign Application Priority Data
Jun. 11, 2021 (FI) ................................. 20215685

(51) Int. Cl.
*H04L 27/12* (2006.01)
*H04L 27/16* (2006.01)
*H04W 52/02* (2009.01)

(52) U.S. Cl.
CPC .............. *H04L 27/12* (2013.01); *H04L 27/16* (2013.01); *H04W 52/0235* (2013.01)

(58) Field of Classification Search
CPC ...... H04L 27/12; H04L 27/16; H04W 52/0235
USPC ......................................................... 375/303
See application file for complete search history.

(56) References Cited

U.S. PATENT DOCUMENTS

| | | |
|---|---|---|
| 2016/0373237 A1 | 12/2016 | Shellhammer et al. |
| 2018/0131544 A1 | 5/2018 | Dicola et al. |
| 2018/0152333 A1* | 5/2018 | Shellhammer ...... H04L 27/2614 |
| 2018/0279274 A1* | 9/2018 | Sun ........................ H04W 52/50 |
| 2020/0045635 A1 | 2/2020 | Lin et al. |

FOREIGN PATENT DOCUMENTS

| | | |
|---|---|---|
| EP | 3437281 B1 | 12/2019 |
| GB | 1194900 A | 6/1970 |

OTHER PUBLICATIONS

International Search Report for PCT/EP2022/065623 mailed Oct. 5, 2022, 4 pages.

(Continued)

*Primary Examiner* — Leila Malek
(74) *Attorney, Agent, or Firm* — Nixon & Vanderhye PC

(57) ABSTRACT

According to an aspect, there is provided a method for transmitting a low-power radio signal, comprising: transmitting, by a radio device, a data radio signal by using binary frequency-shift-keying modulation introducing a phase change between consecutive bit intervals in the data radio signal; and transmitting, by the radio device, a wake-up radio signal using the binary frequency-shift-keying modulation where repetition coding is applied before the frequency-shift-keying to eliminate the phase change between consecutive bit intervals in the wake-up radio signal.

18 Claims, 2 Drawing Sheets

(56) References Cited

OTHER PUBLICATIONS

Written Opinion of the ISA for PCT/EP2022/065623 mailed Oct. 5, 2022, 6 pages.
Finnish Search Report for FI 20215685 dated Feb. 8, 2022, 2 pages.
Wang Po-Han Peter et al., "An Interference-Resilient BLE-Compatible Wake-Up Receiver Employing Single-Die Multi-Channel FBAR-Based Filtering and a 4-D Wake-Up Signature", IEEE Journal of Solid-State Circuits, IEEE, USA, vol. 56, No. 2, Aug. 12, 2020, pp. 416-426.
Cheng Kuang-Wei et al., "An Ultralow-Power OOK/BFSK/DBPSK Wake-Up Receiver Based on Injection-Locked Oscillator", IEEE Transactions on Very Large Scale Integration (VLSI) Systems, IEEE Service Center, Piscataway, NJ, USA, vol. 29, No. 7, Apr. 28, 2021, pp. 1379-1391.

* cited by examiner

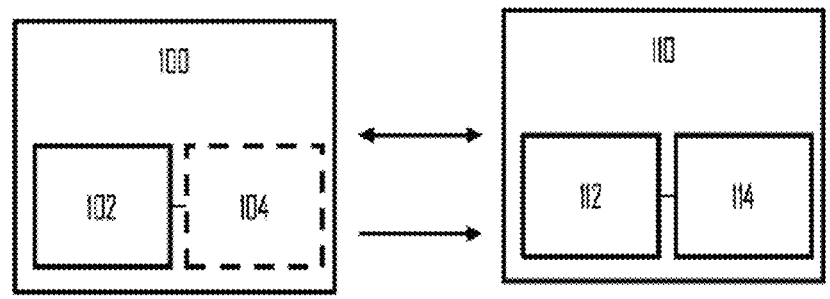
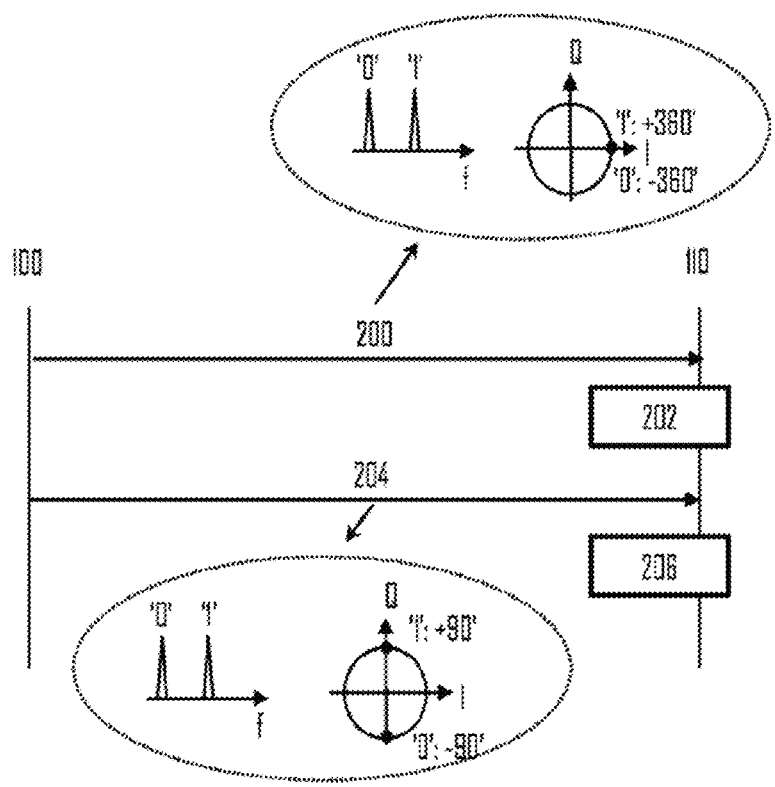

LOW-POWER RADIO TRANSMISSIONS

CROSS-REFERENCE TO RELATED APPLICATIONS

This application is the U.S. national phase of International Application No. PCT/EP2022/065623 filed Jun. 9, 2022 which designated the U.S. and claims priority to FI 20215685 filed Jun. 11, 2021, the entire contents of each of which are hereby incorporated by reference.

TECHNICAL FIELD

Various example embodiments relate to low-power radio transmissions for low-power radio devices. In particular, the embodiments relate to a signal structure of a radio transmission.

BACKGROUND

With the development of various internet-of-things devices, development to reduce power consumption has also improved. There exist various low-power radio protocols, of which Bluetooth and Zigbee are examples. As a further example of the low-power radios, a wake-up radio concept is developed for several radio protocols. In the wake-up radio concept, a radio device comprises a main radio having a relatively high power consumption (e.g. in the order of milliwatts) and wake-up radio having substantially lower power consumption (e.g. in the order of microwatts). When the radio device is in a power-save mode, the main radio is disabled while the wake-up radio is operational and senses a radio channel for a wake-up radio signal. Upon detecting a wake-up radio signal addressed to the radio device, the wake-up radio wakes the main radio up to start communication.

BRIEF DESCRIPTION

According to an aspect, there is provided a method for transmitting a low-power radio signal, comprising: transmitting, by a radio device, a data radio signal by using binary frequency-shift-keying modulation introducing a phase change between consecutive bit intervals in the data radio signal; and transmitting, by the radio device, a wake-up radio signal using the binary frequency-shift-keying modulation where repetition coding is applied before the frequency-shift-keying to eliminate the phase change between consecutive bit intervals in the wake-up radio signal.

An effect of eliminating the phase change is that a wake-up receiver at a receiver of the wake-up radio signal can be made less complex.

In an embodiment, the phase change with the data radio signal results from a phase change of $\mp 90$ degrees, depending on a bit value, and the length of the repetition coding is four, altering bit-to-bit phase change to $\mp 360$ degrees in the wake-up radio signal and providing an effectively constant phase between the consecutive bit intervals in the wake-up radio signal. This embodiment follows the effect of eliminating the phase change so that the wake-up receiver at the receiver of the wake-up radio signal can be made less complex.

In an embodiment, the radio device supports a first transmission mode having a first data rate for transmitting the data radio signal and a second transmission mode having a second data rate, different from the first data rate for transmitting the data radio signal, and wherein the same length of repetition coding is applied to both first and second transmission mode when transmitting the wake-up radio signal. As long as the phase change between consecutive bits remains the same in both (all) transmission modes, the same length of the repetition coding may be applied.

In an embodiment, the data radio signal and the wake-up radio signal are transmitted by using the same radio transmitter circuitry. Accordingly, no separate wake-up radio transmitter is needed.

According to an aspect, there is provided a method for receiving a low-power radio signal, comprising: receiving, by a wake-up radio interface of a radio device, a wake-up radio signal using binary frequency-shift-keying modulation having repetition coding and a constant phase between consecutive bit intervals, each bit interval comprising a number of modulation symbol intervals dependent on a length of the repetition coding; upon receiving the wake-up radio signal, enabling a main radio interface of the radio device; and receiving, by the main radio interface, a data radio signal using binary frequency-shift-keying modulation introducing a phase change between consecutive bit intervals in the data radio signal. An effect of the constant phase is that the wake-up radio interface can be made less complex.

In an embodiment, the phase change with the data radio signal results from a phase change of $\mp 90$ degrees, depending on a bit value, and the length of the repetition coding is four, altering bit-to-bit phase change to $\mp 360$ degrees in the wake-up radio signal and providing the constant phase between the consecutive bit intervals in the wake-up radio signal.

In an embodiment, the wake-up radio interface comprises a quadrature receiver comprising an in-phase signal path and a quadrature signal path for the wake-up signal, wherein one of the in-phase signal path and quadrature signal path is coupled to a clock input of a D flip flop while the other of the in-phase signal path and quadrature signal path is coupled to a D-input of the D flip flop, and wherein a sequence bit values of a wake-up signal is acquired from an output of the D flip flop circuit. Accordingly, a very simple receiver structure can be achieved.

In an embodiment, the phase change of the data radio signal is different from a phase change of $n* \mp 360$ degrees where $n \geq 1$ and an integer.

According to an aspect, there is provided an apparatus for low-power radio transmissions, comprising: means for causing transmission a data radio signal by using binary frequency-shift-keying modulation introducing a phase change between consecutive bit intervals in the data radio signal; and transmitting, by the radio device, a wake-up radio signal using the binary frequency-shift-keying modulation where repetition coding is applied before the frequency-shift-keying to eliminate the phase change between consecutive bit intervals in the wake-up radio signal.

In an embodiment, the phase change with the data radio signal results from a phase change of $\mp 90$ degrees, depending on a bit value, and the length of the repetition coding is four, altering bit-to-bit phase change to $\mp 360$ degrees in the wake-up radio signal and providing a constant phase between the consecutive bit intervals in the wake-up radio signal.

In an embodiment, the radio device supports a first transmission mode having a first data rate for transmitting the data radio signal and a second transmission mode having a second data rate, different from the first data rate for transmitting the data radio signal, and wherein the same length of repetition coding is applied to both first and second transmission mode when transmitting the wake-up radio signal.

In an embodiment, the data radio signal and the wake-up radio signal are transmitted by using the same radio transmitter circuitry.

According to an aspect, there is provided an apparatus for a low-power radio device, comprising: means for receiving, via a wake-up radio interface, a wake-up radio signal using binary frequency-shift-keying modulation having repetition coding and a constant phase between consecutive bit intervals, each bit interval comprising a number of modulation symbol intervals dependent on a length of the repetition coding; means for enabling, upon receiving the wake-up radio signal, a main radio interface of the radio device; and means for receiving, via the main radio interface, a data radio signal using binary frequency-shift-keying modulation introducing a phase change between consecutive bit intervals in the data radio signal.

In an embodiment, the phase change with the data radio signal results from a phase change of $\mp 90$ degrees, depending on a bit value, and the length of the repetition coding is four, altering bit-to-bit phase change to $\mp 360$ degrees in the wake-up radio signal and providing the constant phase between the consecutive bit intervals in the wake-up radio signal.

In an embodiment, the wake-up radio interface comprises a quadrature receiver comprising an in-phase signal path and a quadrature signal path for the wake-up signal, wherein one of the in-phase signal path and quadrature signal path is coupled to a clock input of a D flip flop while the other of the in-phase signal path and quadrature signal path is coupled to a D-input of the D flip flop, and wherein the wake-up radio interface is configured to acquire a sequence bit values of a wake-up signal is acquired from an output of the D flip flop circuit.

Embodiments are defined in the dependent claims. The scope of protection sought for various embodiments is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which FIG. 1 illustrates a radio communication scenario to which embodiments may be applied and block diagrams of apparatuses according to some embodiments;

FIG. 2 illustrates a signaling diagram of a procedure according to an embodiment;

Detailed Description of Some Embodiments

Figure 3:
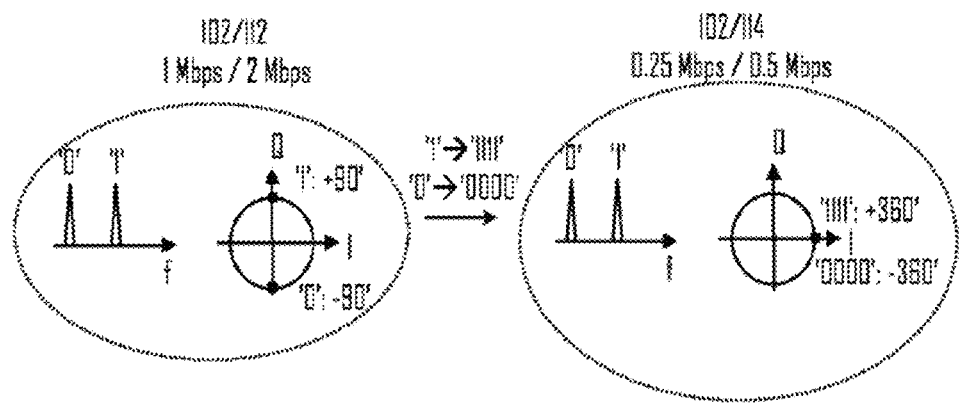
FIG. 3 illustrates a technical effect of some embodiments.

In the following, different exemplifying embodiments will be described with reference to the accompanying Figures. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

FIG. 1 illustrates a communication scenario between two radio devices 100, 110 to which some embodiments of the invention may be applied. The embodiments described below are generally applicable to any low-power communication scenario and protocol. For the purpose of bidirectional communication over a radio interface, each radio device 100, 110 may comprise a main radio interface 102, 112. The main radio interface may support one or more communication protocols for bidirectional radio communication. Examples of such communication protocols include Bluetooth®, Zigbee, and other IEEE 802.15-based protocols, for example. As described in Background, the wake-up radios have been developed for, for example, the Bluetooth® protocol. For that purpose, each radio device 100, 110 may comprise a wake-up radio interface 104, 114. The wake-up radio interface 104, 114 may comprise a wake-up receiver and be void of a radio transmitter. The purpose of the wake-up receiver may be to operate as a radio frequency trigger circuit configured to let the main radio interface to stay disabled until there is a need to transfer data.

Let us consider some communication modes between the radio devices 100, 110. In an active mode, the main radio interfaces 102, 112 may both be enabled, and data may be transferred between the main radio interfaces. The data may be application layer data, e.g. measurement data or any other payload data transferred between the radio devices 100, 110. This is illustrated by the bidirectional arrow between the radio devices in FIG. 1. In the active mode, the wake-up receiver 104, 114 may be disabled because there is no need to wake up an active (enabled) main radio interface. In a situation where there is no need for the transfer of data, at least the radio device 110 may enter a power-save mode where the main radio interface 112 is disabled and the wake-up radio interface is enabled. In this mode, the power consumption is smaller because of absence of radio transmissions and because the main radio interface having substantially higher power consumption than the wake-up radio interface is disabled. In conventional systems, the power consumption of the wake-up radio interface is at least a decade smaller than the power consumption of the main radio interface. When the radio device 100 has data to be transmitted to the radio device 110 that is in the power-save mode, it may first transmit a wake-up radio signal (illustrated by a unidirectional arrow in FIG. 1) to the radio device 110. The wake-up radio signal may contain information indicating that the wake-up radio signal is addressed to the radio device 110 and not to any other radio device. In other embodiments, the wake-up radio signal may be a generic signal waking up any radio device in the power-save mode and capable of detecting the wake-up radio signal. Upon detecting the wake-up radio signal, the wake-up radio interface 114 may generate an enablement signal that (directly or indirectly) causes a wake-up of the main radio interface 112. Thereafter, the data transfer may commence between the radio devices.

The radio device 100 may also comprise a wake-up radio interface 104. However, the following description focuses on embodiments where the radio device 100 wakes up the radio device 110, so the wake-up radio interface 104 may be in a secondary role. In some embodiments where the radio device 100 is an always-on device, the wake-up radio interface may even be omitted.

The main radio interfaces 102, 112 and the wake-up radio interfaces 104, 114 may comprise respective radio frequency circuitries capable of transmitting and/or receiving radio frequency signals and performing respective radio-frequency signal processing operations. The radio interfaces 102, 104, 112, 114 may further comprise a baseband signal processing circuitry configured to process signals described herein on a baseband. The respective radio devices 100, 110 may further comprise at least one processor and at least one memory or a processing circuitry for controlling the operation of the respective radio interfaces 102, 104, 112, 114.

Frequency-shift keying (FSK) is a modulation technique used in the Bluetooth and other radio protocols. In the FSK, frequency of a carrier signal is modulated to contain information (data). In binary FSK, the carrier signal is modulated to two different frequencies, depending on whether a binary '1' or a binary '0' is being transmitted. A binary '1' may be represented by a positive frequency deviation and a binary '0' may be represented by a negative frequency deviation. The FSK has inherent advantages over amplitude shift keying (ASK), for example. One advantage is tolerance against interference. With the ASK, any radio signal may block reception of an ASK-modulated signal, while with the FSK the interfering radio signal must be precisely on a particular frequency to interfere with the FSK reception. This principle applies to the wake-up radios as well. Furthermore, some filtering or other signal processing techniques may be applied on top of the modulation to improve certain characteristics of the transmitted signals. For example, Gaussian filtering may be applied to make the modulation technique a Gaussian FSK (GFSK). The FSK-modulated signal may be filtered by using a filter with a Gaussian response curve to reduce sidebands of a main carrier of the resulting data radio signal, thus reducing interference to adjacent frequency channels.

The main radio interfaces 102, 112 may support the FSK modulation technique. The main radio interfaces 102, 112 may further be configured to transmit both the data radio signals and the wake-up radio signals. The data radio signals may be transmitted by using the FSK where a frequency shift in the modulation causes a phase change in the data radio signal. The changing phase may be tolerable with the main radio interfaces but introduce problems with the design of the wake-up radio interface. For example, the phase changes may add a direct-current (DC) component to the wake-up signal in the wake-up receiver, thus raising a need for a DC block circuit such as a high-pass or bandpass filter to remove the DC component. In some conventional receivers, a received radio signal is down-converted to an intermediate frequency before demodulation. The down-conversion (frequency-mixing) process may leave a DC component in the signal that will have to be cancelled out before the demodulation. This DC removal may be implemented either by a conventional high pass filter or by some other means. In some implementations, the intermediate frequency will, however, be at DC (0 Hz or close to that). When a radio signal has ∓90 degree bit-to-bit phase changes, it can be shown that after the down-conversion, for some data sequences such as an alternating sequence of '0' and '1', the signal on the intermediate frequency will occupy only a quadrant of a unit circle. This means that the signal itself has a DC component of the same or similar magnitude as the signal itself. Removal of this unwanted DC component will therefore be more complicated, and may require a more complex DC block. The repetition coding according to the embodiments avoids this problem by ensuring that the wake-up radio signal will encircle the whole unit circle on the bit level, and a less complex DC block may be employed, thus reducing the complexity of the wake-up receiver.

FIG. 2 illustrates an improved procedure for transmitting the radio signals between the radio devices 100, 110. Referring to FIG. 2, the radio device 100 transmits in step 204 a data radio signal by using binary frequency-shift-keying modulation introducing a phase change between consecutive bit intervals in the data radio signal. In step 200, the radio device 100 transmits a wake-up radio signal using the binary frequency-shift-keying modulation where repetition coding is applied before the frequency-shift-keying to eliminate the phase change between consecutive bit intervals in the wake-up radio signal.

Let us then describe the procedure from the perspective of the radio device 110. The radio device 110 receives (step 200), by the wake-up radio interface 114, the wake-up radio signal using the binary frequency-shift-keying modulation having the repetition coding and the a constant phase between consecutive bit intervals, each bit interval comprising a number of modulation symbol intervals dependent on a length of the repetition coding. Upon receiving the wake-up radio signal, the radio device 110 enables a main radio interface of the radio device 110 in step 202. Thereafter, the radio device receives, via the main radio interface, the data radio signal in step 204. The data radio signal may be demodulated in step 206.

With the wake-up radio signals, the data rate is not an important factor. Therefore, the repetition coding may be used to sacrifice the data rate for gaining the constant bit-to-bit phase that simplifies the design and complexity of the wake-up radio receiver. Accordingly, an advantage of the embodiment of FIG. 2 is the reduced complexity of the wake-up receiver. Further, the repetition coding increases the phase difference between the consecutive bits, thus making the resulting signal highly tolerant against phase noise. Accordingly, the detection performance can be improved or, on the other hand, the complexity of the wake-up receiver can be reduced. For example, a local oscillator in the wake-up receiver may be allowed to be less accurate and accordingly less complex. Further, the repetition coding increases a modulation index of the FSK modulation, thus improving the sensitivity of the wake-up radio interface. For example, a wake-up radio signal of lower reception signal strength can still be detected, thanks to the increase in the modulation index by the virtue of the repetition coding.

The constant phase shall be understood from the perspective of the modulation and to exclude external factors that affect the phase, such as thermal noise, tolerances in the design and performance of the circuits, etc.

As described above, the phase change of the data radio signal may be different from a phase change of n*∓360 degrees where n≥1 and an integer. Thanks to the repetition coding, the phase change of the wake-up radio signal then becomes a multiple of ∓360 degrees (including zero degrees), effectively corresponding to a phase change of zero degrees. This is meant by the constant-phase feature.

FIG. 2 further illustrates the effect of the repetition coding within the dashed circles related to steps 200 and 204. When transmitting the data radio signal, one symbol per one bit, the phase change caused by the modulation is ∓90 degrees. It means that for each bit in a bit sequence, a phase shift of ∓90 degrees is introduced into the carrier signal. For example, the phase shift of the carrier signal is +90 degrees F. or each bit having a binary value '1' and −90 degrees for each bit having a binary value '0'. There may always be the phase change between the consecutive modulation symbols, only the sign of the phase change changes according to the binary value. As a consequence, there is a phase change in the carrier signal after every bit or modulation symbol. The phase change may be observed as a phase shift in a sinusoidal waveform of the carrier signal. The phase shift may, depending on the implementation, be a linear phase shift or have a non-linear form. When using the repetition coding appropriately, the bit-to-bit phase change is altered to ∓360 degrees or a multiple of ∓360 degrees, thereby providing the constant-phase characteristic across the bit intervals and gaining the advantages described above. Referring to FIG. 2, the repetition factor of four changes the bit-level phase shift of ∓90 degrees to a bit-level phase shift of ∓360 degrees with the logic that the phase shift is +360 degrees for the binary value '1' and −360 degrees for the binary value '0' of the subsequent bit. A symbol-level phase shift remains the same ∓90 degrees, as in the data radio signal.

In an embodiment, the main radio interfaces 102, 112 comply with the Bluetooth communication protocol(s), at least on a physical protocol layer. The Bluetooth supports the FSK (GFSK) with several data rates R, e.g. 1 Megabit per second (Mbps) or 2 Mbps. With the 1 Mbps, the frequency deviation between the two binary values ('1' and '0') of data is $\Delta f=250$ kiloHertz (kHz), and the resulting modulation index h can be computed by $h=2*\Delta f/R=0.5$. By using the repetition coding, the data rate R reduces proportionally to the length of the repetition. When the length of the repetition is two ('1' to '11' or '0' to '00'), the data rate halves. The resulting modulation index is then 1. When the length of the repetition is four, ('1' to '1111' or '0' to '0000'), the data rate drops to one quarter. The resulting modulation index is then 2. The higher modulation index results in better detection performance. But more importantly, the repetition also affects the bit-level phase change so that the phase change can be avoided on the bit level. With the wake-up radio signals, the data rate is a less important factor because the sole purpose of the wake-up radio signal is to wake up the main radio interface for the (higher data rate) communication. FIG. 3 illustrates the effect of the repetition coding.

Referring to FIG. 3, the main radio interfaces 102, 112 may employ the FSK modulation illustrated on the left-hand side of FIG. 3 and in the diagrams at the bottom of FIG. 3. Accordingly, the bit-to-bit phase changes are ∓90 degrees. The phase of the data radio signal may be represented as a triangular signal. In other words, the phase of the data radio signal may be under constant change, even during a bit interval. In other embodiments, the phase of the data radio signal may have another form, e.g. closer to a square waveform than a triangular waveform.

When transmitting the wake-up signal, the radio device 100 may enable the use of the repetition coding (length four in this case) and, accordingly, the main radio interface 102 of the radio device may transmit the wake-up radio signal with the lower data rate (0.25 Mbps for the 1 Mbps mode and 0.5 Mbps for the 2 Mbps mode) but with the constant phase between the consecutive bit intervals, thanks to the bit-to-bit phase change being n*∓360 degrees (where n is an integer and n≥1). In this situation, the main radio interface 112 of the radio device 110 is disabled and the radio device 110 receives the wake-up radio signal via the wake-up radio interface 114. In some embodiments where the wake-up radio interface 104 of the radio device 100 has the transmission capability, the wake-up radio interface may be configured to transmit the wake-up radio signal instead, by using the repetition coding.

Instead of the length four in the repetition coding, the length of the repetition coding may be higher than four to increase the modulation index, e.g. eight to provide resulting in a phase change ∓720 between consecutive bit intervals.

Accordingly, in an embodiment the radio device 100 supports a first transmission mode having a first data rate (e.g. 1 Mbps) for transmitting the data radio signal and a second transmission mode having a second data rate (e.g. 2 Mbps), different from the first data rate for transmitting the data radio signal, and the radio device 100 applies the same length of repetition coding to both first and second transmission mode when transmitting the wake-up radio signal. In both transmission modes, the phase change between the consecutive modulation symbols is the same (e.g. ∓90 degrees) and, as a consequence, the same length of the repetition coding (four or multiple of four) may be used for both transmission modes to achieve the constant-phase capability between consecutive bit intervals.

In a similar manner with other protocols, the repetition coding may be used to remove the phase change present in a normal data transmission mode. For example, if the phase change is ∓180 degrees on the symbol level, the repetition factor may be two to bring the phase change to ∓360 degrees on the bit level. The same principle may be applied to other modulation methods resulting in a phase change between consecutive modulation symbols in a data transmission mode.

Figure 4:
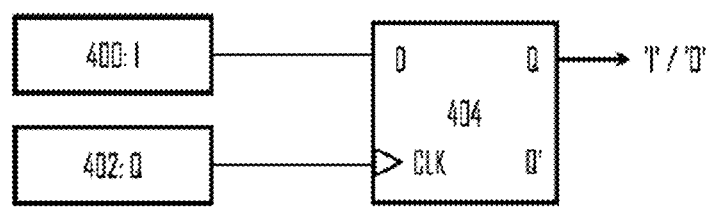
FIG. 4 illustrates a topology of a wake-up radio receiver according to an embodiment.

The high modulation index introduced by the repetition coding results in that the carrier signal comprises multiple zero crossings during a bit interval comprising multiple symbol intervals having the same symbol value, thanks to the repetition coding. Accordingly, the phase change between consecutive symbols during the bit interval remains the same +90 degrees or −90 degrees, depending on whether the bit value is '1' or '0'. This feature can be exploited when the wake-up radio interface comprises a quadrature receiver illustrated in FIG. 4. After a radio frequency front-end, a received radio signal may be divided into an in-phase (I) signal path 400 and a quadrature (Q) signal path 402. An amplitude limiter may be provided in I and Q signal paths to remove any amplitude perturbations. A GFSK modulator may in this case be realized by a simple D flip flop circuit 404. The D flip flop circuit 404 may comprise a low number of D flip flops, e.g. one or multiple D flip flops. The in-phase signal path may be coupled to a D-input of the D flip flop circuit, while the quadrature signal path is coupled to a clock input of the D flip flop circuit. A sequence bit values of the wake-up signal may then be acquired from an output of the D flip flop circuit.

The embodiments are described above mainly in the context where the repetition coding is applied to wake-up radio signals. Alternatively, or additionally, the repetition coding according to the principles described above may be applied to at least some data radio signals, e.g. in a low-power data transmission mode. In such embodiments, the radio devices 100 and 110 may both be even void of the wake-up receiver, and the repetition coding is applied to transmissions between the main radio interfaces 102, 112. In yet another embodiment, the radio device 110 may be a low-power radio device with reduced complexity. In such a case, the radio device 100 may apply the repetition coding to all data radio transmissions addressed to the low-complexity radio device 110. In other words, the radio device 100 or an apparatus for the radio device may transmit, to the low-power radio device 110, a data radio signal by using the binary FSK modulation by using the repetition coding to remove the phase change between consecutive bit intervals in the data radio signal. The radio device 110 may receive the data radio signal employing the repetition coding via the main radio interface 112 that has the reduced complexity, e.g. without the filter for removing the DC component.

In an embodiment, there is provided an apparatus for a radio device 100 configured to perform the transmission in steps 200 and 204 of the process of FIG. 2, or any one of the embodiments thereof. The apparatus may comprise at least a processing system comprising at least one processor and at least one memory comprising a computer program code readable by the at least one processor. The computer program code may form a computer program product defining a computer process executed by the at least one processor, when the at least one processor reads and executes the computer program code. The apparatus may be comprised in the radio device 100 as a controller controlling the main radio interface 102 and, optionally, the wake-up radio interface 104. In other embodiments, the apparatus is the radio device 100. In normal data radio signal transmissions such as step 204, the processing system may disable the repetition coding. In wake-up radio signal transmissions such as step 200, the processing system may enable the repetition coding according to any one of the embodiments described above.

In an embodiment, there is provided an apparatus for a radio device 110 configured to perform the reception in steps 200 and 204 and blocks 202 and 206 of the process of FIG. 2, or any one of the embodiments thereof. The apparatus may comprise at least a processing system comprising at least one processor and at least one memory comprising a computer program code readable by the at least one processor. The computer program code may form a computer program product defining a computer process executed by the at least one processor, when the at least one processor reads and executes the computer program code. The apparatus may be comprised in the radio device 110 as a controller controlling the main radio interface 112 and the wake-up radio interface 114. In other embodiments, the apparatus is the radio device 110. In an active mode where normal data radio signal transmissions such as step 204 are performed, the processing system may keep the main radio interface 112 enabled. In a power-save mode, the processing system may disable the main radio interface and enable the wake-up radio interface 114 to receive wake-up radio signal transmissions according to any one of the embodiments described above.

As used in this application, the term 'processor' or 'processing system' refers to one or more of the following: hardware-only circuit implementations such as implementations in only analogue and/or digital circuitry; combinations of hardware circuits and software and/or firmware; and circuits such as a microprocessor(s) or a portion of a microprocessor(s) that require software or firmware for operation, even if the software or firmware is not physically present. This definition of 'circuitry' applies to uses of this term in this application. As a further example, as used in this description, the term 'processor' or 'processing system' would also cover an implementation of merely a processor (or multiple processors) or portion of a processor, e.g. one core of a multi-core processor, and accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The process described in FIG. 2 or any of the embodiments thereof may also be carried out in the form of one or more computer processes defined by one or more computer programs. The computer program(s) may be in source code form, object code form, or in some intermediate form, and it may be stored in a carrier or a distribution medium, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to systems defined above but also to other systems. The protocols used, the specifications of the systems and their elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. A method for transmitting a low-power radio signal, comprising:
   transmitting, by a radio device, a data radio signal by using binary frequency-shift-keying modulation introducing a phase change between consecutive bit intervals in the data radio signal; and
   transmitting, by the radio device, a wake-up radio signal using the binary frequency-shift-keying modulation where repetition coding is applied before the frequency-shift-keying to eliminate the phase change between consecutive bit intervals in the wake-up radio signal.

2. The method of claim 1, wherein the phase change with the data radio signal results from a phase change of $\mp 90$ degrees, depending on a bit value, and the length of the repetition coding is four, altering bit-to-bit phase change to $\mp 360$ degrees in the wake-up radio signal and providing a constant phase between the consecutive bit intervals in the wake-up radio signal.

3. The method of claim 1, wherein the radio device supports a first transmission mode having a first data rate for transmitting the data radio signal and a second transmission mode having a second data rate, different from the first data rate for transmitting the data radio signal, and wherein the same length of repetition coding is applied to both first and second transmission mode when transmitting the wake-up radio signal.

4. The method of claim 1, wherein the data radio signal and the wake-up radio signal are transmitted by using the same radio transmitter circuitry.

5. The method of claim 1, wherein the phase change of the data radio signal is different from a phase change of $n^* \mp 360$ degrees where $n \geq 1$ and an integer.

6. A method for receiving a low-power radio signal, comprising: receiving, by a wake-up radio interface of a radio device, a wake-up radio signal using binary frequency-shift-keying modulation having repetition coding and a constant phase between consecutive bit intervals, each bit interval comprising a number of modulation symbol intervals dependent on a length of the repetition coding;
   upon receiving the wake-up radio signal, enabling a main radio interface of the radio device; and receiving, by the main radio interface, a data radio signal using binary frequency-shift-keying modulation introducing a phase change between consecutive bit intervals in the data radio signal.

7. The method of claim 6, wherein the phase change with the data radio signal results from a phase change of $\mp 90$ degrees, depending on a bit value, and the length of the repetition coding is four, altering bit-to-bit phase change to $\mp 360$ degrees in the wake-up radio signal and providing the constant phase between the consecutive bit intervals in the wake-up radio signal.

8. The method of claim 6, wherein the wake-up radio interface comprises a quadrature receiver comprising an in-phase signal path and a quadrature signal path for the wake-up radio signal, wherein one of the in-phase signal path and quadrature signal path is coupled to a clock input of a D flip flop while the other of the in-phase signal path and quadrature signal path is coupled to a D-input of the D flip flop, and wherein a sequence bit values of a wake-up radio signal is acquired from an output of the D flip flop.

9. The method of according to claim 6, wherein the phase change of the data radio signal is different from a phase change of $n^* \mp 360$ degrees where $n \geq 1$ and an integer.

10. An apparatus for low-power radio transmissions, comprising means for:
  causing transmission of a data radio signal by using binary frequency-shift-keying modulation introducing a phase change between consecutive bit intervals in the data radio signal; and
  transmitting a wake-up radio signal using the binary frequency-shift-keying modulation where repetition coding is applied before the frequency-shift-keying to eliminate the phase change between consecutive bit intervals in the wake-up radio signal.

11. The apparatus of claim 10, wherein the phase change with the data radio signal results from a phase change of $\mp 90$ degrees, depending on a bit value, and the length of the repetition coding is four, altering bit-to-bit phase change to $\mp 360$ degrees in the wake-up radio signal and providing a constant phase between the consecutive bit intervals in the wake-up radio signal.

12. The apparatus of claim 10, wherein the means are configured to support a first transmission mode having a first data rate for transmitting the data radio signal and a second transmission mode having a second data rate, different from the first data rate for transmitting the data radio signal, and to apply the same length of repetition coding to both first and second transmission mode when transmitting the wake-up radio signal.

13. The apparatus of claim 10, wherein the means comprise a radio transmitter circuitry configured to transmit both the data radio signal and the wake-up radio signal.

14. The apparatus of claim 10, wherein the phase change of the data radio signal is different from a phase change of $n^* \mp 360$ degrees where $n \geq 1$ and an integer.

15. An apparatus for a low-power radio device, comprising means for:
  receiving, via a wake-up radio interface, a wake-up radio signal using binary frequency-shift-keying modulation having repetition coding and a constant phase between consecutive bit intervals, each bit interval comprising a number of modulation symbol intervals dependent on a length of the repetition coding;
  enabling, upon receiving the wake-up radio signal, a main radio interface of the radio device; and
  receiving, via the main radio interface, a data radio signal using binary frequency-shift-keying modulation introducing a phase change between consecutive bit intervals in the data radio signal.

16. The apparatus of claim 15, wherein the phase change with the data radio signal results from a phase change of $\mp 90$ degrees, depending on a bit value, and the length of the repetition coding is four, altering bit-to-bit phase change to $\mp 360$ degrees in the wake-up radio signal and providing the constant phase between the consecutive bit intervals in the wake-up radio signal.

17. The apparatus of claim 15, wherein the wake-up radio interface comprises a quadrature receiver comprising an in-phase signal path and a quadrature signal path for the wake-up radio signal, wherein one of the in-phase signal path and quadrature signal path is coupled to a clock input of a D flip flop while the other of the in-phase signal path and quadrature signal path is coupled to a D-input of the D flip flop, and wherein the means are configured to acquire a sequence of bit values of a wake-up radio signal from an output of the D flip flop.

18. The apparatus of claim 15, wherein the phase change of the data radio signal is different from a phase change of $n^* \mp 360$ degrees where $n \geq 1$ and an integer.

* * * * *